(12) United States Patent
Hoyle et al.

(10) Patent No.: US 11,442,953 B2
(45) Date of Patent: Sep. 13, 2022

(54) METHODS AND APPARATUSES FOR IMPROVED DATA INGESTION USING STANDARDIZED PLUMBING FIELDS

(71) Applicant: MCKESSON CORPORATION, San Francisco, CA (US)

(72) Inventors: Keith Hoyle, Montgomery, TX (US); Manuel Salgado, Spring, TX (US); Marion A. Brown, Spring, TX (US); Rajesh Yalamanchili, Conroe, TX (US)

(73) Assignee: McKesson Corporation, San Francisco, CA (US)

( * ) Notice: Subject to any disclaimer, the term of this patent is extended or adjusted under 35 U.S.C. 154(b) by 1029 days.

(21) Appl. No.: 15/086,534

(22) Filed: Mar. 31, 2016

(65) Prior Publication Data
US 2017/0286504 A1    Oct. 5, 2017

(51) Int. Cl.
*G06F 16/25* (2019.01)
*G06F 16/21* (2019.01)
*G06F 16/22* (2019.01)

(52) U.S. Cl.
CPC .......... *G06F 16/254* (2019.01); *G06F 16/217* (2019.01); *G06F 16/2282* (2019.01); *G06F 16/25* (2019.01)

(58) Field of Classification Search
CPC ......... G06F 17/30339; G06F 17/30353; G06F 17/30294; G06F 17/30424; G06F 16/212; G06F 16/2282; G06F 16/245; G06F 16/2308; G06F 16/254; G06F 16/217; G06F 16/23

USPC .......................... 707/770, 791, 802, 812, 705
See application file for complete search history.

(56) References Cited

U.S. PATENT DOCUMENTS

| | | |
|---|---|---|
| 5,560,005 A | 9/1996 | Hoover et al. |
| 6,175,837 B1 | 1/2001 | Sharma et al. |
| 6,738,798 B1 | 5/2004 | Ploetz et al. |
| 6,801,915 B1 | 10/2004 | Mack |
| 7,822,710 B1 | 10/2010 | Miller et al. |

(Continued)

OTHER PUBLICATIONS

In re: Hoyle; U.S. Application titled Methods and Apparatuses for Improved Data Modeling Using a Relational Database Management System; U.S. Appl. No. 15/086,266, filed Mar. 31, 2016.

(Continued)

*Primary Examiner* — William B Partridge
*Assistant Examiner* — Berhanu Mitiku
(74) *Attorney, Agent, or Firm* — Ballard Spahr LLP

(57) ABSTRACT

Embodiments are disclosed for improved data modeling in a relational database management system. In the context of a method, an example embodiment includes ingesting, by data ingestion circuitry and using a set of standardized plumbing fields comprising descriptive fields including at least a stage table primary key field, a source primary key field, and a source attribute field, one or more records into one or more stage tables in a staging layer. This example embodiment further includes generating, by data modeling circuitry and using the one or more stage tables in the staging layer, a data integration layer for modeling data represented by the data ingested into the one or more stage tables in the staging layer. Corresponding apparatuses and computer program products are also provided.

20 Claims, 10 Drawing Sheets

(56) References Cited

U.S. PATENT DOCUMENTS

| | | | |
|---|---|---|---|
| 8,341,191 B2 | 12/2012 | Weinberg | |
| 9,684,512 B2 | 6/2017 | Bai et al. | |
| 9,805,081 B2 | 10/2017 | Scott et al. | |
| 2004/0034550 A1 | 2/2004 | Menschik et al. | |
| 2004/0078236 A1 | 4/2004 | Stoodley et al. | |
| 2005/0050068 A1 | 3/2005 | Vaschillo et al. | |
| 2006/0036624 A1 | 2/2006 | Hild et al. | |
| 2006/0136469 A1 | 6/2006 | Dettinger et al. | |
| 2008/0092112 A1* | 4/2008 | Jin | G06F 16/2433 717/106 |
| 2010/0125579 A1 | 5/2010 | Pardoe et al. | |
| 2011/0004622 A1* | 1/2011 | Marson | G06Q 10/06 707/812 |
| 2011/0110515 A1 | 5/2011 | Tidwell et al. | |
| 2013/0268567 A1* | 10/2013 | Adjei-Banin | G06F 16/254 707/812 |
| 2014/0067867 A1* | 3/2014 | Pattabhi | G06F 16/24542 707/E17.055 |
| 2015/0074038 A1* | 3/2015 | Sarferaz | G06F 16/283 707/602 |
| 2016/0085914 A1 | 3/2016 | Douglass et al. | |
| 2016/0357839 A1 | 12/2016 | Hiltz-Laforge et al. | |

OTHER PUBLICATIONS

Anchor Modeling—Wikipedia, the free encyclopedia [online] [retrieved May 3, 2016. Retrieved from the Internet: <URL: https://en.wikipedia.org/wiki/Anchor_modeling> (3 pages).

Data Vault Modeling—Wikipedia, the free encyclopedia [online] [retrieved May 3, 2016. Retrieved from the Internet: <URL: https://en.wikipedia.org/wiki/Data_Vault_modeling>(11 pages).

Non-Final Office Action dated Feb. 27, 2018 by the U.S. Patent and Trademark Office for U.S. Appl. No. 15/086,266, filed Mar. 31, 2016 and published as US 2017/0286468 on Oct. 5, 2017 (Inventor—Hoyle et al.; Applicant—McKesson Corp.) (16 pages).

Final Office Action dated Aug. 15, 2018 by the U.S. Patent and Trademark Office for U.S. Appl. No. 15/086,266, filed Mar. 31, 2016 and published as US 2017/0286468 on Oct. 5, 2017 (Inventor—Hoyle et al.; Applicant—McKesson Corp.) (23 pages).

U.S. Appl. No. 15/086,266 (2017/0286468), filed Mar. 31, 2016 (Oct. 5, 2017), Keith Hoyle (McKesson Corp.).

Non-Final Office Action dated Jan. 24, 2019 by the U.S. Patent and Trademark Office for U.S. Appl. No. 15/086,266, filed Mar. 31, 2016 and published as US 2017/0286468 on Oct. 5, 2017 (Inventor—Hoyle et al.; Applicant—McKesson Corp.) (21 pages).

Final Office Action dated Jun. 20, 2019 by the U.S. Patent and Trademark Office for U.S. Appl. No. 15/086,266, filed Mar. 31, 2016 and published as US 2017/0286468 A1 on Oct. 5, 2017 (Inventor—Hoyle et al.) (21 pages).

Response to Final Office Action dated Aug. 20, 2019 to the U.S. Patent and Trademark Office for U.S. Appl. No. 15/086,266, filed Mar. 31, 2016 and published as US 2017/0286468 A1 on Oct. 5, 2017 (Inventor—Hoyle et al.) (14 pages).

Advisory Action dated Sep. 11, 2019 by the U.S. Patent and Trademark Office for U.S. Appl. No. 15/086,266, filed Mar. 31, 2016 and published as US 2017/0286468 A1 on Oct. 5, 2017 (Inventor—Hoyle et al.) (3 pages).

* cited by examiner

METHODS AND APPARATUSES FOR IMPROVED DATA INGESTION USING STANDARDIZED PLUMBING FIELDS

TECHNOLOGICAL FIELD

Example embodiments of the present invention relate generally to database modeling and, more particularly, to methods and apparatuses for using standardized plumbing fields to improve data ingestion by a database modeling platform.

BACKGROUND

Traditional data modeling techniques suffer from a variety of defects. For instance, many traditional data modeling techniques (e.g., anchor modeling and data vault modeling) require one to understand what information will be important in a resulting data model (e.g., what data users need to review, and how would they view the data) prior to implementation. This information is typically the result of one or more Joint Application Design (JAD) sessions between various stakeholders involved in the implementation of the data model.

Similarly, such modeling techniques require a granular understanding of the data sources so that the relevant information can be harvested. Thus, one must learn how to decipher the types of data contained in records received from the various data sources, and one must also learn how that data is organized so it can be retrieved accurately and completely. Because the implementation of traditional modeling schemes requires that all of this must be known prior to implementation of the data model, there is a significant delay incurred before one can even begin to use a new data modeling platform.

Another downside to implementation of existing data modeling techniques is that they often carry a lack of transparency back to the data sources. In environments where records are subject to audit (e.g., due to laws or regulations governing sensitive information), changes to source data must be well-documented. Accordingly, traditional data modeling techniques that manipulate data end up becoming themselves subject to audit.

Finally, when data modeling platforms utilize transient staging areas, processing errors that extend past the retention window for transient data are not recoverable.

BRIEF SUMMARY

Example embodiments described herein address the above deficiencies and provide methods and apparatuses that can increase the efficiency of data ingestion by a database modeling platform. Specifically, example embodiments enable the ingestion of data before (or in parallel with) determining what underlying information will be important to the organization or understanding the structure and contents of the underlying data sources.

Similarly, through the use of a robust set of standardized plumbing fields, example embodiments described herein provide complete traceability and clarity regarding the evolution of modeled data received from the data sources, thus ensuring that the data modeling platform can efficiently respond in the event of an audit. In this regard, implementation of example embodiments may in fact exclude the data modeling platform from audit in the first place, as the techniques described herein do not alter the underlying source data in the first place.

In a first example embodiment, a method is provided for improved data ingestion in a relational database management system. The method includes ingesting, by data ingestion circuitry and using a set of standardized plumbing fields comprising descriptive fields including a stage table primary key field, a source primary key field, and a source attribute field, one or more records from a plurality of data sources into one or more stage tables in a staging layer, wherein each of the one or more stage tables corresponds to one of the plurality of data sources, and generating, by data modeling circuitry and using the one or more stage tables in the staging layer, a data integration layer for modeling data represented by the data ingested into the one or more stage tables in the staging layer.

In some embodiments, the method further includes processing a query requesting information for retrieval, identifying, by the data modeling circuitry, using the data integration layer and a subset of the one or more stage tables, data corresponding to the information for retrieval, and outputting the identified data.

In some embodiments, ingesting a target record from a particular data source includes storing a copy of the target record in a particular stage table in the staging layer that corresponds to the particular data source, inserting the set of standardized plumbing fields into the copy of the target record, the set of standardized plumbing fields including a timestamp field in addition to the set of descriptive fields, populating descriptive fields of the set of standardized plumbing fields based on content of the target record, and populating the timestamp field with a current date and time. In some such embodiments, the set of descriptive fields may further include a data source name field, a data source data set name field, and a source delete flag. Additionally, the set of descriptive fields may further includes at least one of an expiry timestamp field and a natural key field.

In some embodiments, ingesting the one or more records into the one or more stage tables in the staging layer includes, for each particular record of the one or more records, determining whether the particular record corresponds to a preexisting record in one of the stage tables in the staging layer, in an instance in which the particular record corresponds to a preexisting record, determining whether the particular record has not been deleted in its corresponding data source, in an instance in which the particular record has not been deleted, determining whether the particular record is different than the preexisting record, and in an instance in which the particular record is different than the preexisting record, storing the particular record, and in an instance in which the particular record does not correspond to a preexisting record, storing the particular record In some such embodiments, determining whether the particular record is different than the preexisting record may include comparing a source attribute field of the particular record to a source attribute field of the preexisting record, in an instance in which the source attribute field of the particular record matches the source attribute field of the preexisting record, comparing a stage table primary key field of the particular record to a stage table primary key field of the preexisting record, in an instance in which the stage table primary key field of the particular record matches the stage table primary key field of the preexisting record, concluding that the particular record is not different than the preexisting record, and in an instance in which the stage table primary key field of the particular record does not match the stage table primary key field of the preexisting record, concluding that the particular record is different than the preexisting record, and in an instance in which the source attribute field of the particular record does not match the source attribute field of the preexisting record, concluding that the particular record is different than the preexisting record.

In some embodiments, the method further includes ingesting, by the data ingestion circuitry and using the standardized plumbing fields, one or more additional records from the plurality of data sources into the one or more stage tables in the staging layer, and updating, by the data modeling circuitry, the data integration layer based on ingested one or more additional records.

In another example embodiment, an apparatus is provided for improved data ingestion in a relational database management system. The apparatus includes at least one processor and at least one memory storing computer-executable instructions, that, when executed by the at least one processor, cause the apparatus to ingest, using a set of standardized plumbing fields comprising descriptive fields including a stage table primary key field, a source primary key field, and a source attribute field, one or more records from a plurality of data sources into one or more stage tables in a staging layer, wherein each of the one or more stage tables corresponds to one of the plurality of data sources, and generate, using the one or more stage tables in the staging layer, a data integration layer for modeling data represented by the data ingested into the one or more stage tables in the staging layer.

In some embodiments, the computer-executable instructions, when executed by the apparatus, further cause the apparatus to process a query requesting information for retrieval, identify, using the data integration layer and a subset of the one or more stage tables, data corresponding to the information for retrieval, and output the identified data.

In some embodiments, the computer-executable instructions, when executed by the apparatus, further cause the apparatus to ingest a target record from a particular data source by causing the apparatus to store a copy of the target record in a particular stage table in the staging layer that corresponds to the particular data source, insert the set of standardized plumbing fields into the copy of the target record, the set of standardized plumbing fields including a timestamp field in addition to the set of descriptive fields, populate descriptive fields of the set of standardized plumbing fields based on content of the target record, and populate the timestamp field with a current date and time. In some such embodiments, the set of descriptive fields may further include a data source name field, a data source data set name field, and a source delete flag. Additionally, the set of descriptive fields may further include at least one of an expiry timestamp field and a natural key field.

In some embodiments, the computer-executable instructions, when executed by the apparatus, cause the apparatus to ingest the one or more records into the one or more stage tables in the staging layer by causing the apparatus to, for each particular record of the one or more records, determine whether the particular record corresponds to a preexisting record in one of the stage tables in the staging layer, in an instance in which the particular record corresponds to a preexisting record, determine whether the particular record has not been deleted in its corresponding data source, in an instance in which the particular record has not been deleted, determine whether the particular record is different than the preexisting record, and in an instance in which the particular record is different than the preexisting record, store the particular record, and in an instance in which the particular record does not correspond to a preexisting record, store the particular record.

In some such embodiments, the computer-executable instructions, when executed by the apparatus, cause the apparatus to determine whether the particular record is different than the preexisting record by causing the apparatus to compare a source attribute field of the particular record to a source attribute field of the preexisting record, in an instance in which the source attribute field of the particular record matches the source attribute field of the preexisting record, compare a stage table primary key field of the particular record to a stage table primary key field of the preexisting record, in an instance in which the stage table primary key field of the particular record matches the stage table primary key field of the preexisting record, conclude that the particular record is not different than the preexisting record, and in an instance in which the stage table primary key field of the particular record does not match the stage table primary key field of the preexisting record, conclude that the particular record is different than the preexisting record, and in an instance in which the source attribute field of the particular record does not match the source attribute field of the preexisting record, conclude that the particular record is different than the preexisting record.

In some embodiments, the computer-executable instructions, when executed by the apparatus, further cause the apparatus to ingest, using the standardized plumbing fields, one or more additional records from the plurality of data sources into the one or more stage tables in the staging layer, and update the data integration layer based on ingested one or more additional records.

In another example embodiment, a computer program product comprising at least one non-transitory computer-readable storage medium is provided for improved data ingestion in a relational database management system. The at least one non-transitory computer-readable storage medium stores computer-executable instructions that, when executed, cause an apparatus to ingest, using a set of standardized plumbing fields comprising descriptive fields including a stage table primary key field, a source primary key field, and a source attribute field, one or more records from a plurality of data sources into one or more stage tables in a staging layer, wherein each of the one or more stage tables corresponds to one of the plurality of data sources, and generate, using the one or more stage tables in the staging layer, a data integration layer for modeling data represented by the data ingested into the one or more stage tables in the staging layer.

In some embodiments, the computer-executable instructions, when executed, further cause the apparatus to process a query requesting information for retrieval, identify, using the data integration layer and a subset of the one or more stage tables, data corresponding to the information for retrieval, and output the identified data.

In some embodiments, the computer-executable instructions, when executed, further cause the apparatus to ingest a target record from a particular data source by causing the apparatus to store a copy of the target record in a particular stage table in the staging layer that corresponds to the particular data source, insert the set of standardized plumbing fields into the copy of the target record, the set of standardized plumbing fields including a timestamp field in addition to the set of descriptive fields, populate descriptive fields of the set of standardized plumbing fields based on content of the target record, and populate the timestamp field with a current date and time. In some such embodiments, the set of descriptive fields may further include a data source name field, a data source data set name field, and a source delete flag. Additionally, the set of descriptive fields may further include at least one of an expiry timestamp field and a natural key field.

In some embodiments, the computer-executable instructions, when executed, cause the apparatus to ingest the one or more records into the one or more stage tables in the staging layer by causing the apparatus to, for each particular record of the one or more records, determine whether the particular record corresponds to a preexisting record in one of the stage tables in the staging layer, in an instance in which the particular record corresponds to a preexisting record, determine whether the particular record has not been deleted in its corresponding data source, in an instance in which the particular record has not been deleted, determine whether the particular record is different than the preexisting record, and in an instance in which the particular record is different than the preexisting record, store the particular record, and in an instance in which the particular record does not correspond to a preexisting record, store the particular record.

In some such embodiments, the computer-executable instructions, when executed, cause the apparatus to determine whether the particular record is different than the preexisting record by causing the apparatus to compare a source attribute field of the particular record to a source attribute field of the preexisting record, in an instance in which the source attribute field of the particular record matches the source attribute field of the preexisting record, compare a stage table primary key field of the particular record to a stage table primary key field of the preexisting record, in an instance in which the stage table primary key field of the particular record matches the stage table primary key field of the preexisting record, conclude that the particular record is not different than the preexisting record, and in an instance in which the stage table primary key field of the particular record does not match the stage table primary key field of the preexisting record, conclude that the particular record is different than the preexisting record, and in an instance in which the source attribute field of the particular record does not match the source attribute field of the preexisting record, conclude that the particular record is different than the preexisting record.

In some embodiments, the computer-executable instructions, when executed, further cause the apparatus to ingest, using the standardized plumbing fields, one or more additional records from the plurality of data sources into the one or more stage tables in the staging layer, and update the data integration layer based on ingested one or more additional records.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings, which are not necessarily drawn to scale.

DETAILED DESCRIPTION

Some embodiments of the present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention.

Overview

Figure 1:
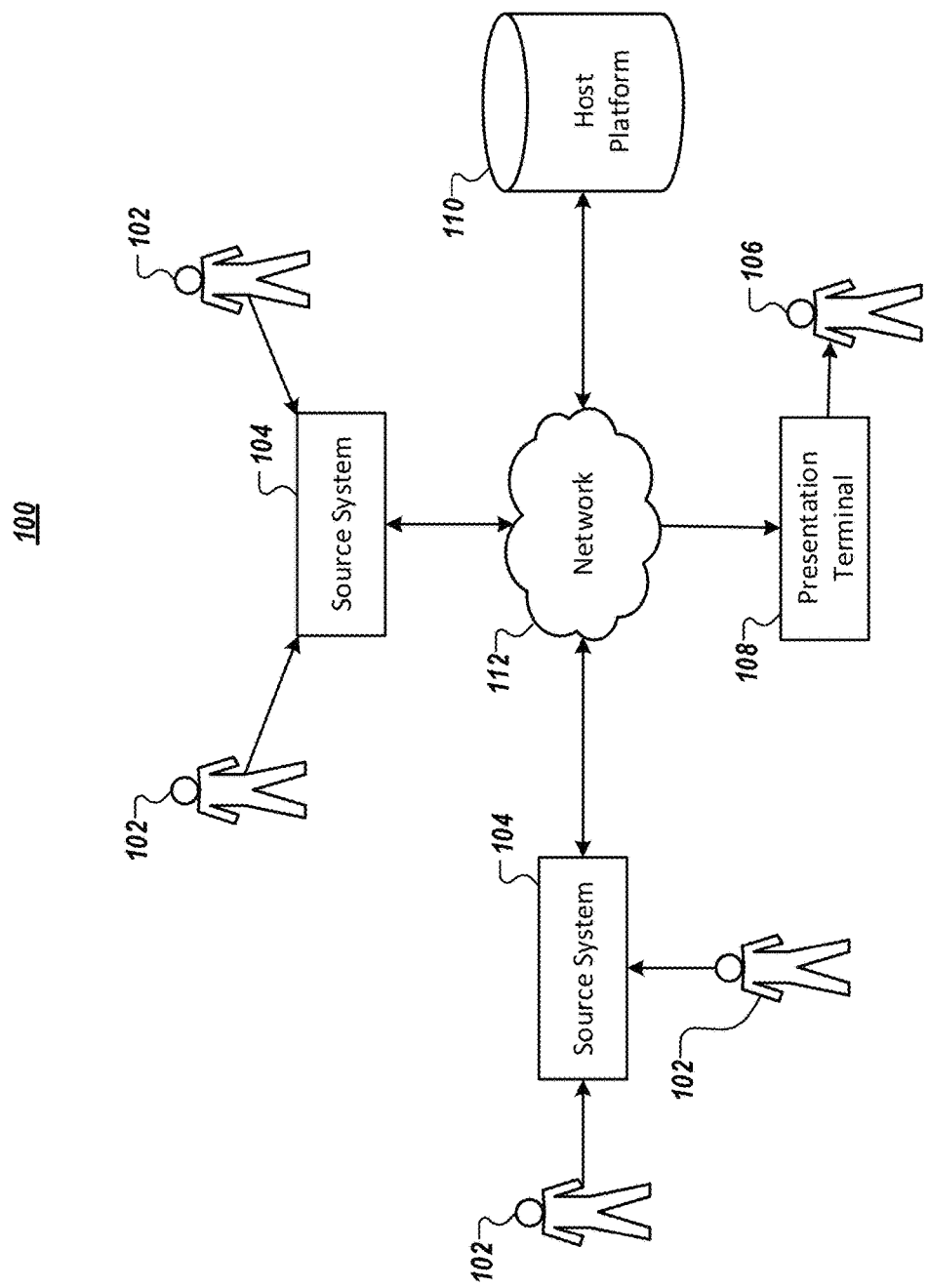
FIG. 1 illustrates a diagram illustrating a typical system relying upon a data modeling platform.

FIG. 1 illustrates a diagram illustrating a typical system 100 relying upon a data modeling platform. As shown in FIG. 1, a series of users 102 may enter data at various times and/or places into various source systems 104. For instance, this data may comprise healthcare provider information regarding a particular patient who has visited a hospital and who has separately visited a doctor's office. The users 102 entering data about that patient may be the various nurses or doctors working at these two locations. Separately, a user 106 (who may, for instance, be another healthcare provider) may be interested in retrieving information about the patient from a presentation terminal 108 (e.g., a computer at the office of user 106). In a global system connected by a network 112 (e.g., the Internet), a host platform 110 may utilize various data modeling techniques designed to manage this process and provide the user 106 with relevant information retrieved from the disparate source systems 104.

However, as mentioned above, many traditional approaches for modeling the data from various source systems 104 present significant problems. Using traditional techniques, the host platform 110 may not be able to retrieve data from source systems 104 until it is known what information is important for the host platform 110. Many other traditional approaches introduce the possibility of encountering unrecoverable processing errors or are otherwise not designed to adequately respond to audits. Through the use of type-2 data warehousing, example embodiments disclosed herein provide solutions that can increase the efficiency and simplicity of data ingestion by a data modeling platform.

Figure 2:
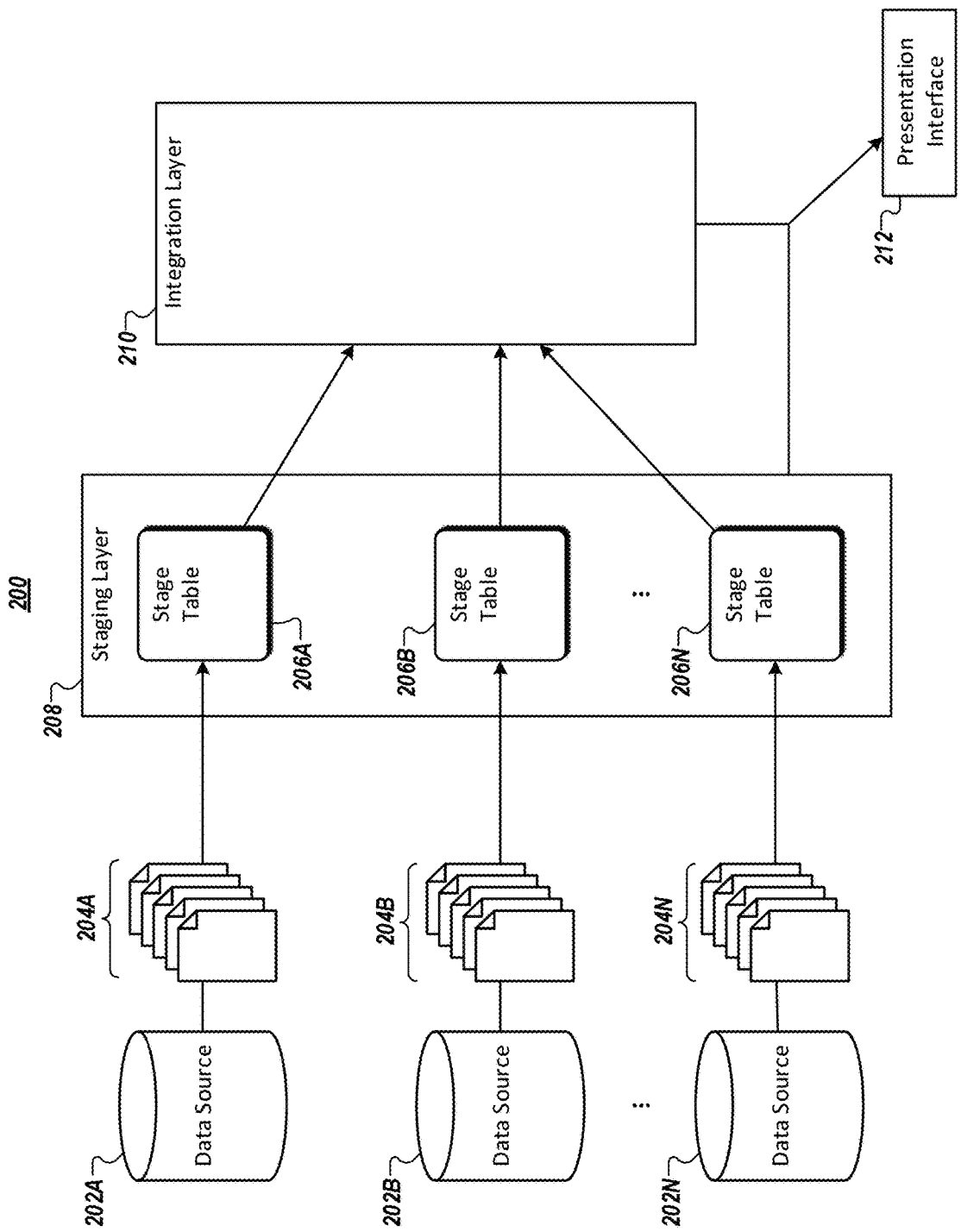
FIG. 2 illustrates a schematic diagram of an example data modeling platform, in accordance with some example embodiments described herein.

Turning to FIG. 2, a schematic diagram is provided illustrating an example data modeling platform 200 in accordance with some example embodiments described herein. As shown in FIG. 2, the data modeling platform 200 may retrieve one or more sets of records 204A-204N from a corresponding series of data sources 202A-202N. These sets of records may then be stored in corresponding stage tables (206A-206N) within a persistent staging layer 208 of the data modeling platform 200. It should be noted that, as opposed to traditional implementations that utilize a transient staging area, permanently persisting the staging layer facilitates both effective tracing of the data used by the data modeling platform 200 in the event of an audit, and also provides the data modeling platform 200 with the ability to address errors in processing that affect any source data received by the staging layer, regardless of when that source data was originally ingested (a problem that affects many traditional data modeling implementations is that errors may corrupt data that was received prior to some arbitrary retention window, rendering these errors unrecoverable).

Each stage table 206 may comprise a type-2 data warehouse, ensuring that each change to a record will be stored in the stage table 206 as a new record and will not overwrite the old version of the record. Permanently persisting records ensures that changes in the records represented by each stage table 206 can be tracked independently from the information contained in any other tables, because any pointers to a previously stored version of a record will not be affected by the storage of a new record (in contrast, physical replacement of an old version of a record with a newer version of that record may cause problems for other tables having pointers to the old version of the record). Accordingly, updating a stage table 206 requires no pre-planning or knowledge. Moreover, the source data can remain entirely unprocessed once ingested and, in some embodiments, it may never be moved after its initial entry into the staging layer.

It should be noted that upon initial receipt of each record from a data source 202, the record will be stored in a stage table 206 corresponding to the data source 202 from which it was received, and the copied record will be modified by the data modeling platform 200 to include one or more standardized plumbing fields that track changes in the record over time. It will be understood that each data source can be interrogated periodically or on an ad hoc basis. For instance, the records contained in the data sources may be retrieved every night and imported into the staging layer for subsequent integration and utilization into the data model as soon as the following day. As another example, the records contained in the data sources may be retrieved and integrated into the data model at times of particularly low data utilization.

Integration layer 210 is illustrated in FIG. 2, and the data modeling platform 200 may integrate the data from the staging layer in a wide variety of ways. In the example implementation described in connection with FIG. 2 of U.S. patent application Ser. No. 15/086,266, filed Mar. 31, 2016, the integration layer may comprise a set of data alignment tables in connection with a set of key mapping tables. However, it will be understood that example embodiments described herein may be utilized in alternative data modeling platforms having a different data integration layer schema, such as Inmon, Kimball, data vault, or anchor modeling techniques.

It should be appreciated that by defining the data integration needs of the data modeling platform 200 independently of the data ingestion aspects of the data modeling platform 200, source data can be collected in the staging layer without a complete accounting of the needs of the data model, and there is no need to delay this data collection even if the requirements of the data model are not yet known. Accordingly, ingestion of data into the staging layer may occur in parallel with any JAD sessions, or the ingestion of data may even occur beforehand. In such fashion, example embodiments contemplated herein can therefore reduce the total time required to initialize the data model.

The data modeling platform 200 may also provide a separate presentation interface 212 to provide users with responses to queries of the data model made by various users (e.g., user 106). This presentation interface 212 may be the only interface visible to the querying users, as the tables contained in the staging layer and integration layer information—while used to respond to queries—may not be visible to users, despite being used to generate data responsive to user queries.

Figure 3A:
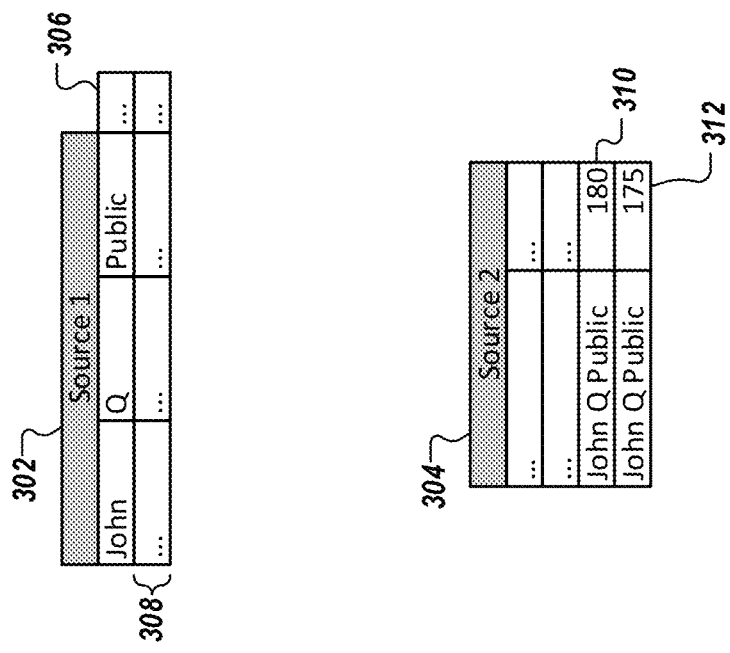
FIG. 3A illustrates example data source tables that may be used by some example embodiments described herein.
Figure 3B:
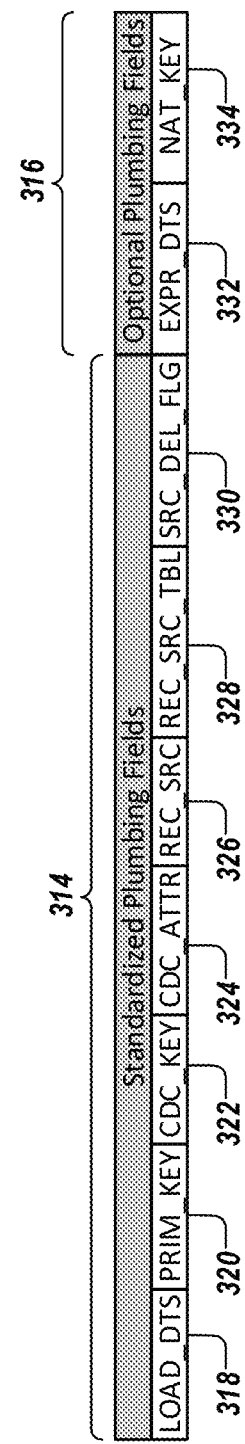
FIG. 3B illustrates a default set of standardized plumbing fields and a separate set of optional plumbing fields, in accordance with some example embodiments described herein.
Figure 3C:
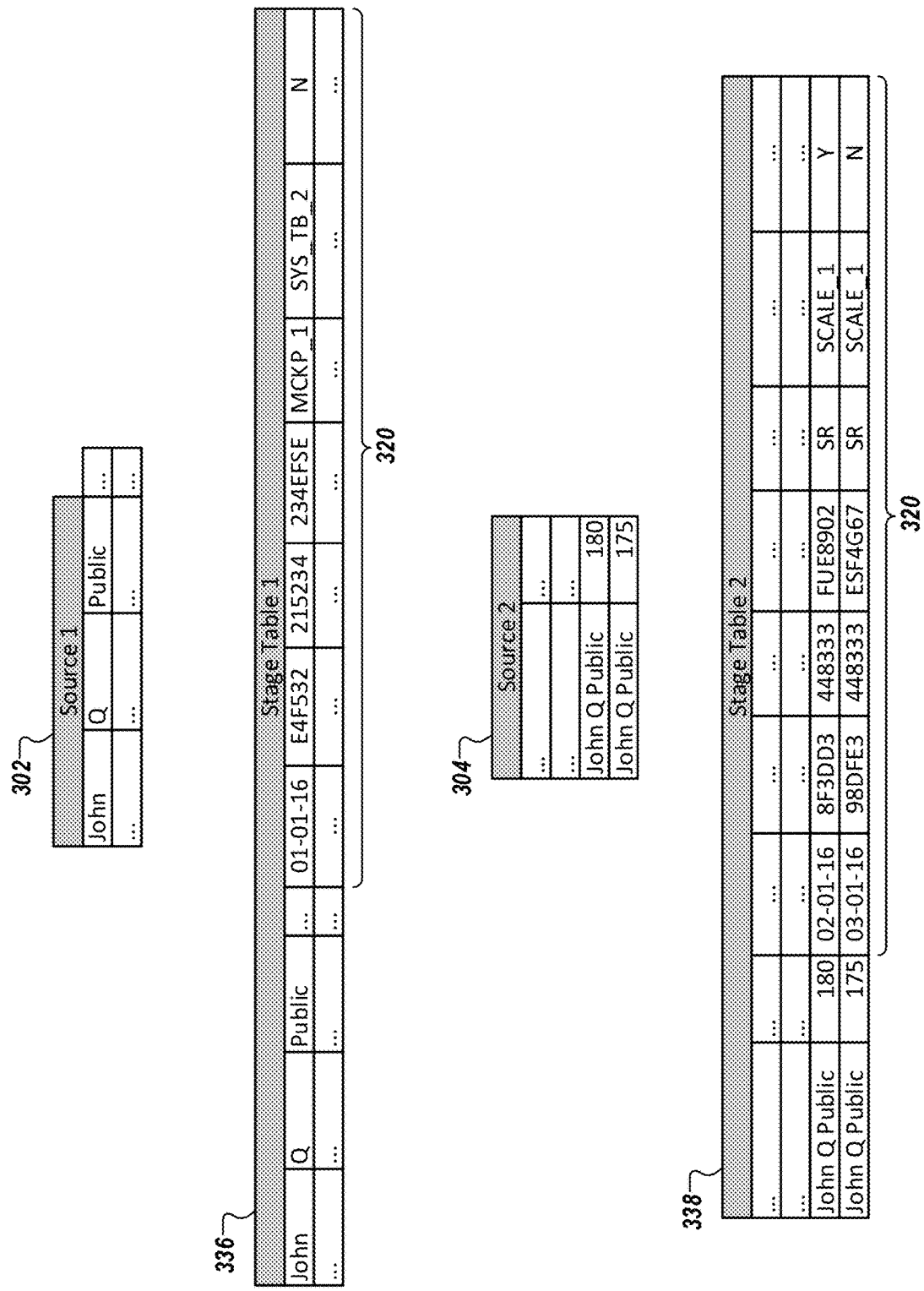
FIG. 3C illustrates an example stage table after ingestion of records from the source tables shown in FIG. 3A, in accordance with some example embodiments described herein.
Figure 3D:
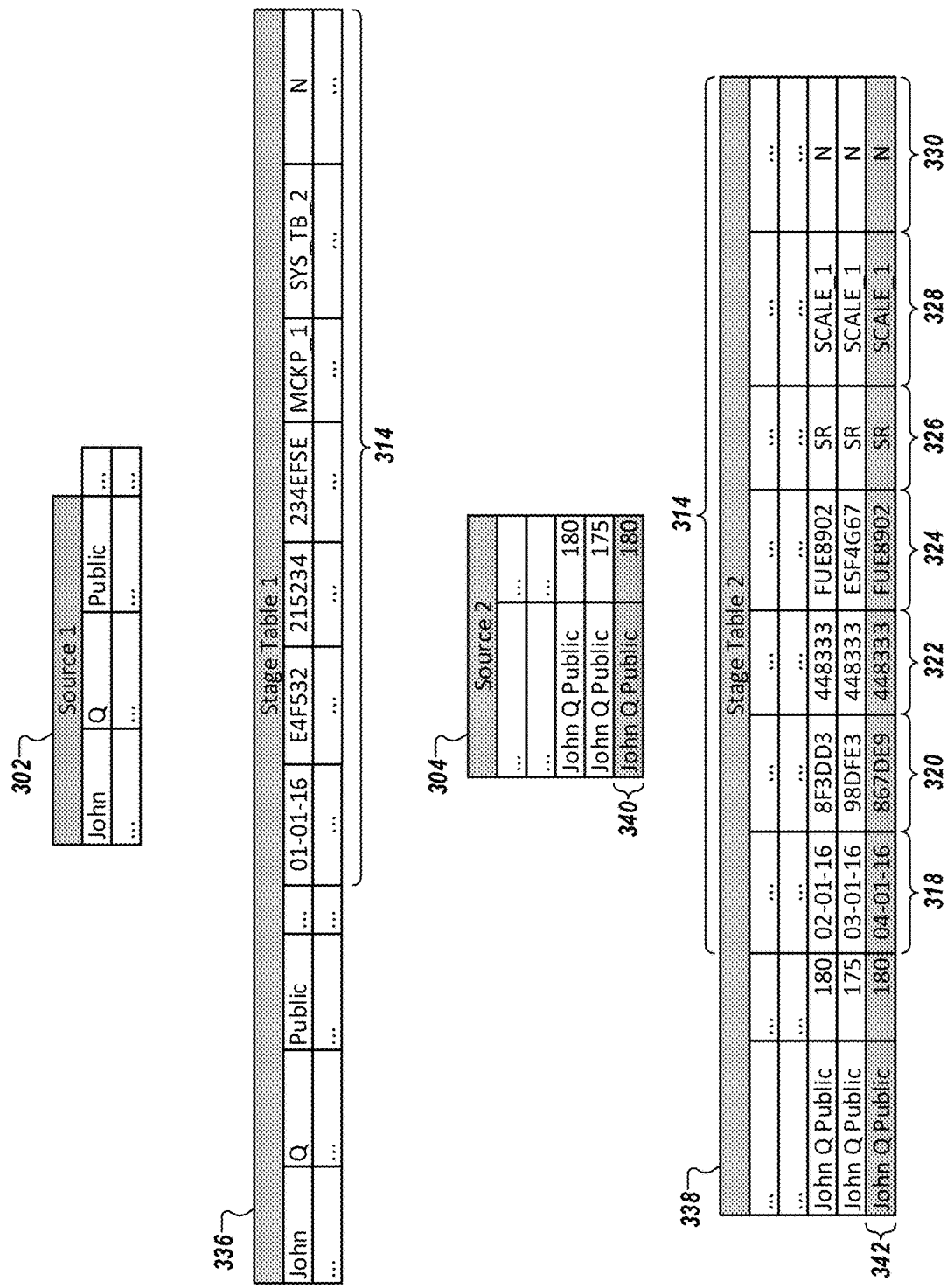
FIG. 3D illustrates another example stage table after ingestion of records from source tables, in accordance with some example embodiments described herein.

Illustration of the manner by which the data modeling platform 200 ingests data may be better understood in connection with FIG. 3A, which illustrates two example data source tables, FIG. 3B, which illustrates an example set of standardized plumbing fields utilized in connection with staging of ingested source data, FIG. 3C, which illustrates an example of two stage tables that have ingested the records from the source tables illustrated in FIG. 3A and that have incorporated the standardized plumbing fields illustrated in FIG. 3B, and FIG. 3D, which provides another example of two stage tables that have ingested records from source tables.

Turning first to FIG. 3A, two example data source tables are shown: source table 302 (labeled "Source 1") and source table 304 (labeled "Source 2"). Source table 302 illustrates only a single record and illustrates three fields of that record "John", "Q", and "Public". However, as shown by field 304, this first record may have additional fields that are simply not relevant to this example (for instance, any additional fields may be non-primary key data fields). Further, as shown at row 308, this source table 304 may include additional records that are not shown in FIG. 3A for clarity of illustration.

Where source table 302 included one record, source table 304 illustrates two records, each of which has two fields. The first record has a field holding the string "John Q Public" and a second field 310 having a value of "180", which in this example illustrates the weight of John Q Public as of storage of the first record. Similarly, the second record is also a record regarding "John Q Public" but the second weight in field 312 has a value of "175". Ingestion of the data contained in these two data sources will be described below in connection with FIGS. 3B and 3C.

Turning first to FIG. 3B, an illustration is provided of a default set of standardized plumbing fields 314 for use by data modeling platform 200, and a separate set of optional plumbing fields 316 that may be included as elements of the standardized plumbing fields in some embodiments contemplated herein. It will be understood that the standardized set of plumbing fields may utilize data concatenation to populate the standardized plumbing fields. In this regard, a list of data from a given set of fields in a given data set may be concatenated (e.g., in order of appearance), and delimited by a standard non-alphanumeric character (or characters) (e.g., '~', '|:|', or the like) for storage in one of the standardized plumbing fields. Similarly, the standardized set of plumbing fields may additionally utilize hashing methods on a given concatenation to produce an output having a higher degree of uniqueness (in this regard, hashing methods that may be used include MD5, Secure Hash Algorithm 1 (SHA-1), or the like). In addition to producing plumbing fields having high degrees of uniqueness, the use of concatenation and hashing in this fashion makes record comparisons simpler, as concatenations or hashes from single data fields can be compared to each other more easily than a plurality of separate fields from one record could be compared to a plurality of fields from another record.

In some embodiments, the standardized plumbing fields may include a field 318 that stores a date/time stamp (which may be referred to as LOAD_DTS) identifying a date/time that the record containing the date/time stamp was ingested into the staging layer. The standardized plumbing fields may also include a field 320 that may be referred to as a warehouse (or stage table) primary key (e.g., PRIM_KEY), which may comprise a hash of all of the source data fields and the LOAD_DTS field. The benefit of this PRIM_KEY field is that it is exceedingly likely that it will be globally unique (as a result of incorporating the LOAD_DTS date/time stamp into the hash). The benefit of having a globally unique key of this nature is that it can ensure that non-duplicate data is always ingested into the staging layer. Without the use of a globally unique key, it is possible that some records that only appear to be duplicates of existing records may be discarded instead of being ingested into the staging layer).

The standardized plumbing fields may also include a field 322 comprising a source primary key (e.g., CDC_KEY), which comprises a hash of source primary key data fields. The source primary key data fields are a subset of all of the source data fields that together uniquely identify a record within that source table. In addition, the standardized plumbing fields may include a source attribute data field 324 (e.g., CDC_ATTR), which comprises a hash of source non-primary key data fields. This field enables the system to identify when a unique record has been modified. Moreover, the standardized plumbing fields may include a source name field 326 (e.g., REC_SRC) that identifies the name of the system of record, and may also include a source data set name field 328 (e.g., REC_SRC_TBL) that identifies the name of the table or file within the system of record. Between the REC_SRC and REC_SRC_TBL fields, the plumbing fields will be able to uniquely identify the data source from which the corresponding data is retrieved with granular particularity. Finally, the standardized plumbing fields may include a source delete flag field 330 (e.g., SRC_DEL_FLG), which may display "Y" or "N" depending on whether the corresponding record in the data source has been physically deleted. The SRC_DEL_FLG plumbing field 330 ensures accuracy of the data stored in the staging layer, as it ensures that records that have been deleted in the data source will not still be utilized for data modeling.

While the above fields are sufficient to usefully ingest most types of records encountered from most data sources, in some optional embodiments the standardized plumbing fields may include additional fields 316, typically for performance or testing reasons. In this regard, these optional plumbing fields include an expiry field 332 identifying a date/time when the corresponding record was overwritten (which may be referred to as EXPR_DTS). For a current record, this plumbing field may, however, either be null or list 12/31/9999 or another similar indicator when the record has not been overwritten yet. It should be understood that the information represented by the EXPR_DTS field can be derived on the fly using SQL analytics functions (e.g., LEAD (load_dts) OVER (PARTITION BY cdc_key ORDER BY load_dts). However, despite the ability to derive the value of this field from other fields, use of the EXPR_DTS field can reduce the processing time needed for certain queries significantly (e.g., a query for lab results in embodiments not using the EXPR_DTS field could result in a search of millions of records, while a search for lab results that have not expired could conclude much more quickly as it would evaluate a much smaller sample size). Another optional field for the standardized set of plumbing fields may comprise a source natural key field 334 (which may be referred to as NAT_KEY), which may comprise a hash of source natural key data fields (e.g., the natural attributes, or business keys included in the record from the data source). The value of this NAT_KEY field is that it can provide another unique key that can avoid any issues caused by, for instance, CDC_KEY collisions (which, while theoretically impossible, sometimes occur due to data entry errors in data sources).

Turning now to FIG. 3C, an illustration is shown of stage tables 336 and 338 demonstrating the ingestion of the records stored in source tables 302 and 304, respectively. In addition, stage tables 336 and 338 also include the addition of the set of standardized plumbing fields 314, as can be seen by their differences from the source tables 302 and 304. Particular example values are shown for each of the fields in the standardized plumbing table, although these values are shown only as a means for illustrating the manner by which stage table records are generated from source table records (and not to suggest some particular manner of calculating those fields). Because data modeling platforms need to consistently track any type of change from any type of data source, the use of standardized plumbing fields in this fashion avoids the need for the database modeling platforms to maintain any source-specific plumbing fields, or employ any methods that would be required to handle such needs on a case by case basis. Similarly, example embodiments utilizing standardized plumbing fields avoid the need for multiple data tracking logic to maintain, monitor, and support the staging layer. Similarly, standardization of the plumbing fields avoids any job scheduling issues inherent to such maintenance, monitoring and support.

Turning next to FIG. 3D, another example illustration is shown of stage tables 336 and 338 to highlight the utility of the PRIM_KEY plumbing field. As shown in FIG. 3D, source table 304 has been modified to include a new record 340, which appears identical to the first listed record (it lists a weight 180). Although this new record 340 includes effectively identical attribute data as the first record, this new record carries new information insofar as it illustrates that John Q Public had regained the 5 pounds he had lost at the time of collection of the second record. Despite conveying new information regarding the weight fluctuation of John Q Public, there is a risk that this new risk would not be stored in stage table 338 because it will include identical CDC_KEY 322 and CDC_ATTR 324 plumbing fields as the first record. To account for this potential issue, the PRIM_KEY plumbing field 320—which incorporates all data fields of the source record as well as the LOAD_DTS 318 field—conveys that this new record 340 is, in fact, a different record from the first record. Specifically, because the LOAD_DTS of the first record is different from the LOAD_DTS corresponding to the new record 340, the PRIM_KEY for the first record is necessarily different from the PRIM_KEY of the new record 340. In turn, FIG. 3D illustrates that the new record is stored in stage table 338 as record 342. As this example illustrates, the inclusion of the PRIM_KEY plumbing field 320 as one of the standardized plumbing fields may prevent the failure to store a new record from a data source into a corresponding stage table.

Accordingly, by utilizing standardized plumbing fields in connection with the ingestion of data from one or more data sources, example embodiments provide a staging layer having a complete history of all source changes in its raw state, which in turn facilitates easy review and debugging. Changes for each source table can thereafter be recorded and tracked independently of any other tables and this recording and tracking requires no additional planning or knowledge (e.g., data ingestion can occur entirely prior to knowing how the ingested data will thereafter be utilized by a later-developed data model. Despite the agnostic nature of this data ingestion procedure, however, these standardized plumbing fields can be effectively leveraged when subsequently performing data integration operations using the corresponding data in the stage tables of the staging layer. Moreover, utilization of standardized plumbing fields of this nature enable the source data to remain entirely unprocessed and never moved from its initial entry point to the warehouse, thus removing the need for costly data transformations and avoiding the potential for a data audit.

System Architecture

Methods, apparatuses, and computer program products of the present invention may be embodied by any of a variety of devices. Example embodiments may include a plurality of devices operating in a globally-networked system. In doing so, example embodiments may utilize any of a variety of fixed terminals, such as desktop computers, mainframe devices, kiosks, or the like. Similarly, example embodiments may also utilize any of a variety of mobile terminals, such as a portable digital assistant (PDA), mobile telephone, smartphone, laptop computer, tablet computer, or any combination of the aforementioned devices.

Figure 4:
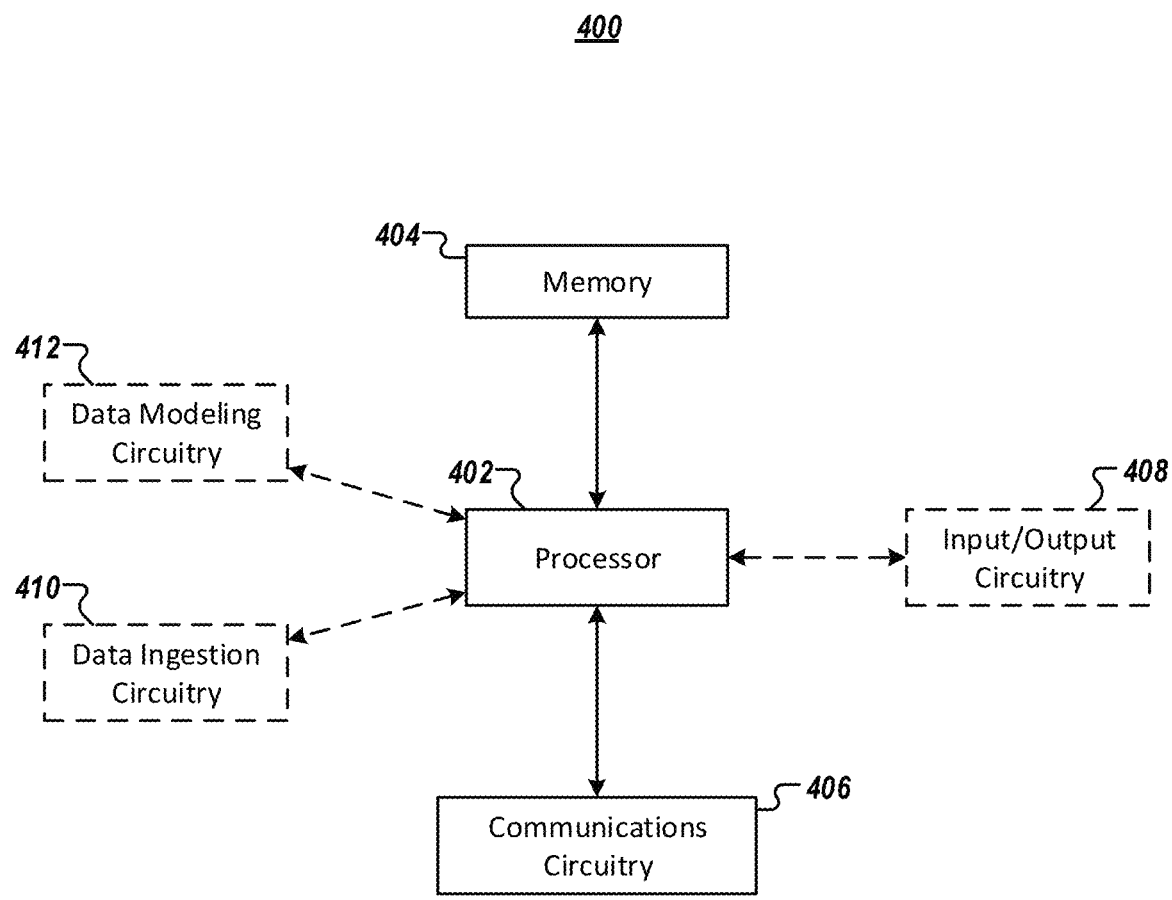
FIG. 4 illustrates a schematic block diagram of example circuitry embodying a device that may perform operations in accordance with some example embodiments described herein.

Turning to FIG. 4, an example apparatus 400 is illustrated that may represent a basic set of components of a device embodying an example system. The apparatus 400 may include a processor 402, a memory 404, and communications circuitry 406. In some embodiments, the device may further include input/output circuitry 408 for interacting with a user, a data ingestion circuitry 410 for receiving and staging data in a staging layer, and data modeling circuitry 412 for populating the data model based on the staged data. The apparatus 400 may be configured to execute the operations described below in connection with FIGS. 5-7. Although these components 402-412 are described with some functional descriptors, it should be understood that the particular implementations necessarily include the use of particular hardware. It should also be understood that certain of these components 402-412 may include similar or common hardware. For example, the data ingestion circuitry 410 and data modeling circuitry 412 may leverage use of the processor 402, memory 404, or communications circuitry 406, to perform its associated functions, and duplicate hardware is not required for the distinct components of the apparatus 400 (although embodiments using duplicated hardware are also contemplated herein). The use of the term "circuitry" as used herein with respect to components of the apparatus therefore includes particular hardware configured to perform the functions associated with the particular circuitry described herein. Of course, while the term "circuitry" should be understood broadly to include hardware, in some embodiments, circuitry may also include software for configuring the hardware components of the apparatus 400.

In some embodiments, the processor 402 (and/or co-processor or any other processing circuitry assisting or otherwise associated with the processor) may be in communication with the memory 404 via a bus for passing information among components of the apparatus. The processor 402 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 402 may be configured to execute instructions stored in the memory 404 or otherwise accessible to the processor. Alternatively or additionally, the processor may be configured to execute hard-coded functionality. As such, whether configured by hardware or software methods, or by a combination of hardware with software, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the memory 404 may be non-transitory and may include, for example, one or more volatile and/or non-volatile memories. In other words, for example, the memory may be an electronic storage device (e.g., a computer readable storage medium). The memory 404 may be configured to store information, data, content, applications, instructions, or the like, for enabling the apparatus to carry out various functions in accordance with example embodiments contemplated herein.

The communications circuitry 406 may be any means such as a device or circuitry embodied in either hardware or a combination of hardware and software that is configured to receive and/or transmit data from/to a network and/or any other device, circuitry, or module in communication with the apparatus 400. In this regard, the communications circuitry 406 may include, for example, a network interface for enabling communications with a wired or wireless communication network. For example, the communications circuitry 406 may include one or more network interface cards, antennae, buses, switches, routers, modems, and supporting hardware and/or software, or any other device suitable for enabling communications via a network. Additionally or alternatively, the communication interface 406 may include the circuitry for interacting with the antenna(s) to cause transmission of signals via the antenna(s) or to handle receipt of signals received via the antenna(s). These signals may be transmitted by the apparatus 400 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols.

In some embodiments, the apparatus 400 may include input/output circuitry 408 that may, in turn, be in communication with processor 402 to provide output to a user and, in some embodiments, to receive an indication of user input. The input/output circuitry 408 may comprise a user interface and may include a display that may include a web user interface, a mobile application, a client device, or the like. In some embodiments, the input/output circuitry 408 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 104, and/or the like).

In addition, the apparatus 400 may also comprise data ingestion circuitry 410, which includes hardware components designed to facilitate the retrieval and staging of data in a staging layer of the data modeling platform. Data ingestion circuitry 410 may utilize processor 402, memory 404, or any other hardware component included in the apparatus 400 to perform these functions. Data ingestion circuitry 410 may further utilize communications circuitry 106 to receive data from a variety of data sources.

Data ingestion circuitry 410 may utilize processing circuitry, such as the processor 402, to facilitate performance of its various operations, and may utilize memory 404 to store state computer instructions that, when executed, cause the data ingestion circuitry 410 to perform those operations. It should be appreciated that, in some embodiments, data ingestion circuitry 410 may include a separate processor, specially configured field programmable gate array (FPGA), or application specific interface circuit (ASIC) to perform the above-described functions. Data ingestion circuitry 410 is therefore implemented using hardware components of the apparatus configured by either hardware or software for implementing these planned functions.

In addition, the apparatus 400 may also comprise data modeling circuitry 412, which includes hardware components designed to populate the data model based on the staged data. Data modeling circuitry 412 may utilize processor 402, memory 404, or any other hardware component included in the apparatus 400 to perform this function.

Data modeling circuitry 412 may utilize processing circuitry, such as the processor 402, to facilitate performance of its various operations, and may utilize memory 404 to store state computer instructions that, when executed, cause the data ingestion modeling circuitry 412 to perform its operations. It should be appreciated that, in some embodiments, data modeling circuitry 412 may include a separate processor, specially configured field programmable gate array (FPGA), or application specific interface circuit (ASIC) to perform the above-described functions. Data modeling circuitry 412 is therefore implemented using hardware components of the apparatus configured by either hardware or software for implementing these planned functions.

As described above and as will be appreciated based on this disclosure, example embodiments may be implemented by a plurality of devices, such as fixed devices, mobile devices, backend network devices, and/or the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

It should be appreciated, with respect to certain devices embodied by apparatus 400 as described in FIG. 4, computer program instructions and/or other type of code may be loaded onto a computer, processor or other programmable apparatus's circuitry to produce a machine, such that the computer, processor other programmable circuitry that execute the code on the machine create the means for implementing various functions described herein.

Having described specific components of an example device (e.g., apparatus 400) that may be utilized to implement some embodiments of the data modeling platform 200 described above, example embodiments of the present invention are described below in connection with a series of flowcharts.

Operations for Improving Efficiency and Reliability of a Data Modeling Platform

Figure 5:
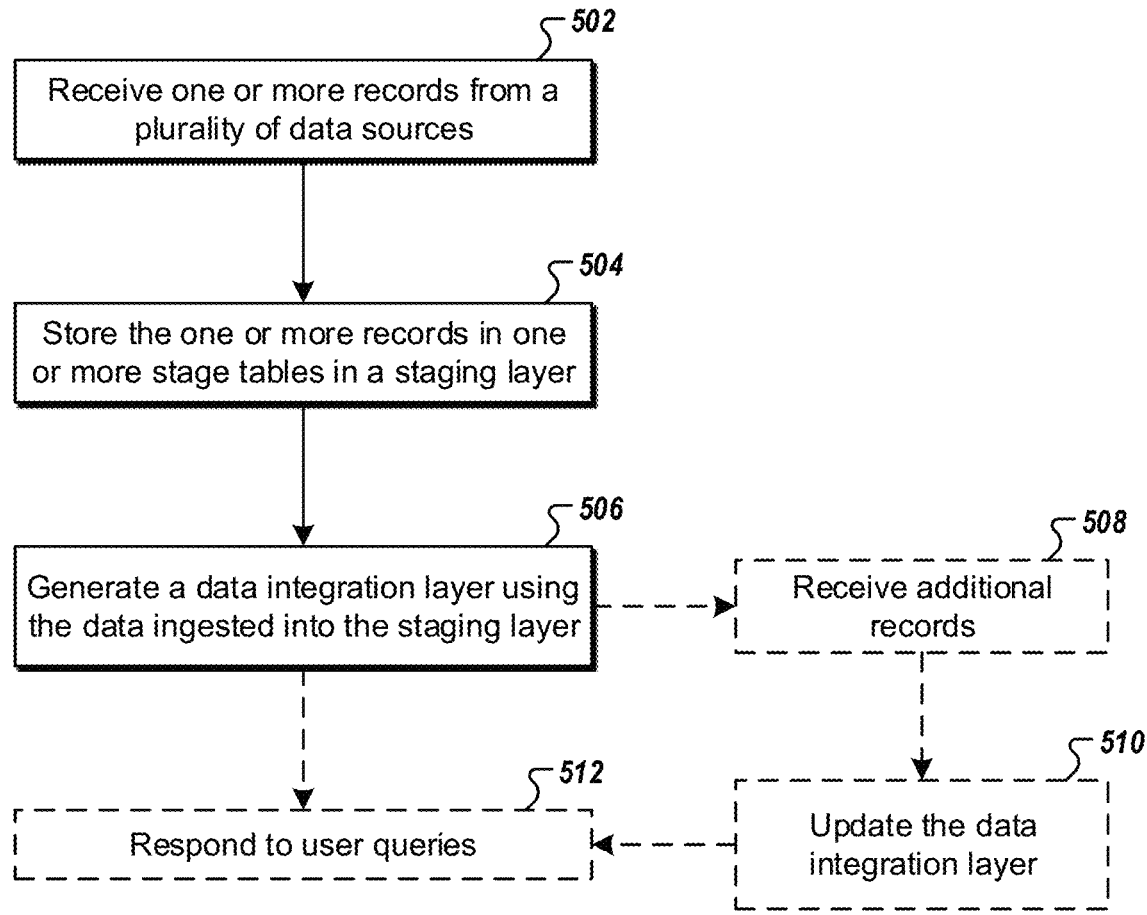
FIG. 5 illustrates a flowchart describing example operations performed by a data modeling platform to improve data ingestion in a relational database management system, in accordance with some example embodiments described herein.
Figure 6:
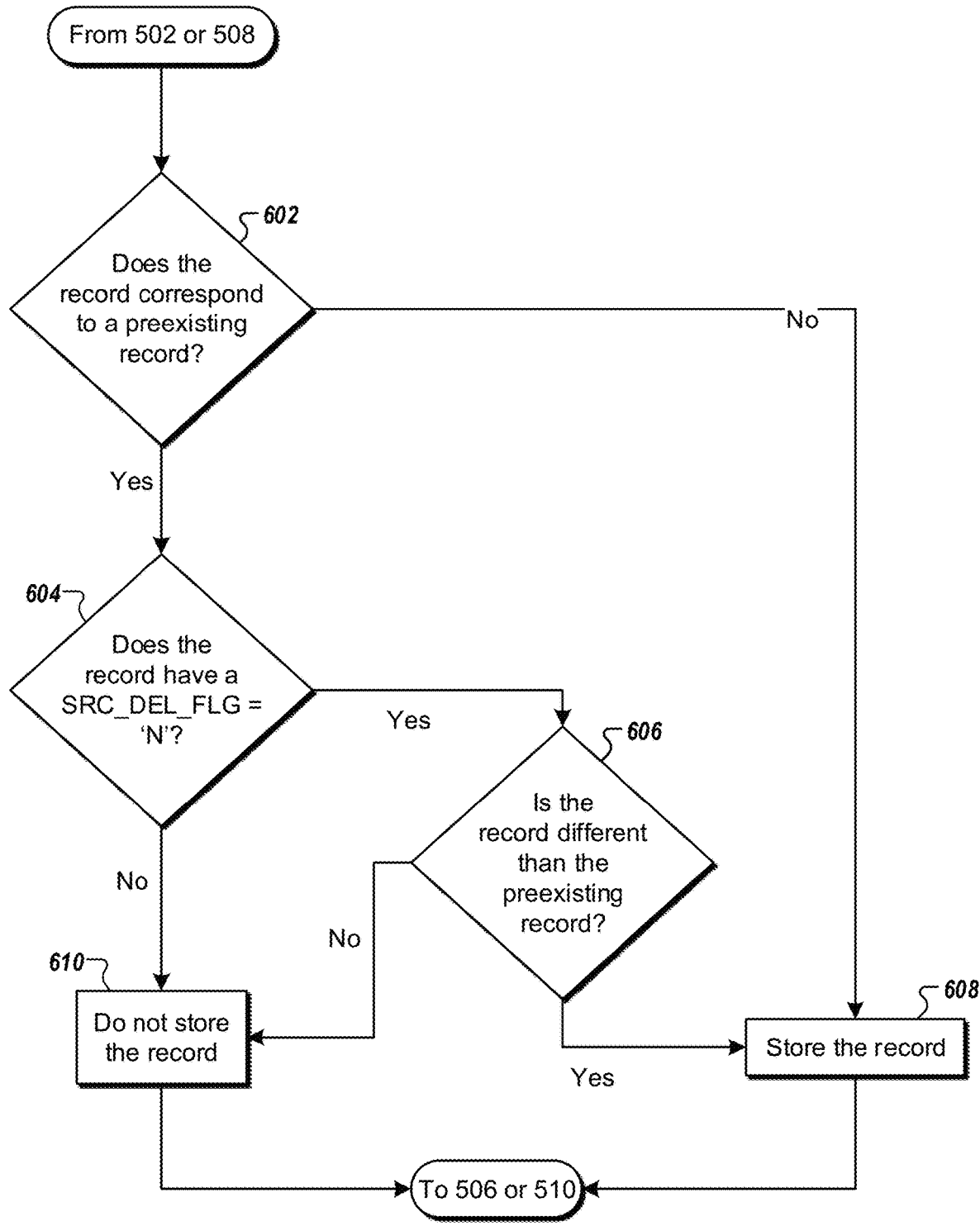
FIG. 6 illustrates a flowchart describing example operations for analyzing inbound records and determining whether to store them in the staging layer, in accordance with some example embodiments described herein.
Figure 7:
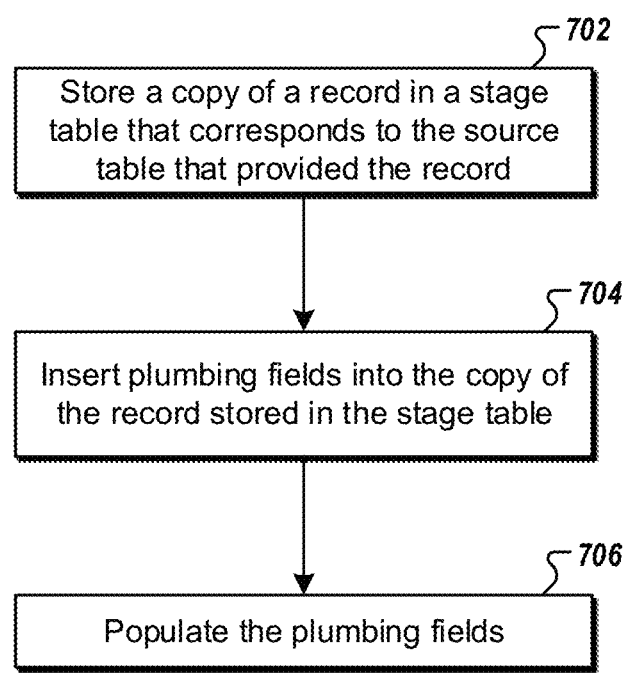
FIG. 7 illustrates a flowchart describing example operations for storing a target record that is received from a particular data source, in accordance with some example embodiments described herein.

Turning to FIGS. 5, 6, and 7, flowcharts are illustrated that contain operations to improve data ingestion in a database modeling platform. The operations illustrated in FIGS. 5, 6, and 7 may, for example, be performed by, with the assistance of, and/or under the control of an apparatus 400 embodying a device operatively controlling a database modeling platform 200 and more particularly through the use of one or more of processor 402, memory 404, communications circuitry 406, input/output circuitry 408, data ingestion circuitry 410, and data modeling circuitry 412.

Turning first to FIG. 5, example operations are provided for improved data ingestion in a relational database management system. To begin with, the apparatus 400 includes means, such as data ingestion circuitry 410 or the like, for ingesting, using a set of standardized plumbing fields comprising descriptive fields including a stage table primary key field, a source primary key field, and a source attribute field, one or more records from a plurality of data sources into one or more stage tables in a staging layer. This data ingestion operation may include two sub-steps: receiving the one or more records and storing the one or more records, as discussed in connection with operations 502 and 504.

In operation 502 the apparatus 400 includes means, such as communications circuitry 306, input/output circuitry 308, data ingestion circuitry 410, or the like, for receiving one or more records from the plurality of data sources. Each data source may correspond to a separate business entity in some embodiments. For instance, one data source may comprise patient records from a hospital, while another data source may be patient records from a particular doctor's office, and a third data source may comprise an insurer's patient records. In other embodiments, multiple data sources may correspond to the same business entity. As mentioned previously, the one or more records may be retrieved from the plurality of data sources on a periodic basis (e.g., every night), on a less regular basis as determined by system utilization (e.g., data is retrieved in a batch process whenever utilization of the data modeling platform 200 is below some predetermined threshold), on an event-driven basis, or the like.

In operation 504 the apparatus 400 includes means, such as memory 404, data ingestion circuitry 410, or the like, for storing the one or more records in one or more stage tables in a staging layer. Each of the one or more stage tables corresponds to one of the plurality of data sources. Moreover, each of the one or more stage tables comprises a type-2 data warehouse and each record in each of the one or more stage tables is altered to include a set of standardized plumbing fields, as described previously in connection with FIGS. 3A-3C. Storage of records in the staging layer is also described in greater detail below in connection with FIGS. 6 and 7 below. It will be appreciated that it may not be known what each data field in each of the one or more stage tables actually represents at the time of data ingestion. However, it may be necessary to interpret and utilize the data in each of the one or more stage tables to thereafter utilize the content represented by each record in each stage table within the staging layer.

Accordingly, in some example embodiments contemplated herein, the apparatus 400 may include means, such as data modeling circuitry 412, or the like, for retrieving a definition set defining the type of information stored in each data field of a particular stage table. The definition set may be retrieved from the data source via communications circuitry 406 or it may be retrieved from manual user entry via input/output circuitry 408. In any event, this definition set can then be used by the apparatus 400 to interpret the data in each record of the particular stage table (e.g., for subsequently hydrating a data integration layer based on the records stored in stage tables in the staging layer). Each definition set may be manually created by a person who has a preexisting understanding of the data source corresponding to the particular stage table. Alternatively, in some embodiments a known definition set used for a different stage table may also be used for the particular stage table, if it can be determined that the data source corresponding to that different stage table is associated with the data source corresponding to the particular stage table.

In operation 506 the apparatus 400 includes means, such as data modeling circuitry 412 or the like, for generating, using the one or more stage tables in the staging layer, a data integration layer for modeling data represented by the data ingested into the one or more stage tables in the staging layer. Generating this data integration layer may include generation of one or more data alignment tables and one or more corresponding key mapping tables, as described in connection with FIG. 5 of U.S. patent application Ser. No. 15/086,266, filed Mar. 31, 2016. Accordingly, it will be understood that the use of standardized plumbing fields as described herein may be implemented in the context of the data modeling platform described in connection with U.S. patent application Ser. No. 15/086,266. However, it will also be understood that example embodiments described herein may be utilized in alternative data modeling platforms having a different data integration layer schema, such as Inmon, Kimball, data vault, or anchor modeling techniques. From operation 506, the procedure may advance to operation 512 below. Additionally or alternatively, the procedure may advance to optional operations 508 and 510 below if additional records are to be ingested from one or more of the data sources.

As noted previously, receipt of records from the plurality of data sources may occur periodically or, in any event, may occur more than a single time. Accordingly, in optional operation 508, the apparatus 400 may include means, such as data ingestion circuitry 410 or the like, for ingesting one or more additional records from the plurality of data sources into the one or more stage tables in the staging layer.

From operation 508, the procedure may advance to optional operation 510, in which the apparatus 400 may include means, such as data modeling circuitry 412, or the like, for updating the data integration layer based on the ingested one or more additional records. Subsequently, the procedure may advance to optional operation 512 in an instance in which a user query is received.

In optional operation 512, the apparatus 400 may include means, such as processor 402, communications circuitry 406, input/output circuitry 408, or the like, for responding to user queries. In some embodiments, operation 512 may include processing a query requesting information for retrieval, identifying, using the data integration layer and a subset of the one or more stage tables, data corresponding to the information for retrieval, and outputting the identified data. More specifically, the apparatus 400 may identify the information for retrieval using the data integration layer of the data modeling platform, and the apparatus 400 can then retrieve identifying data from within the data integration layer or from one or more of the stage tables, and then output the collected information.

Turning next to FIG. 6, example operations are described for analyzing inbound records and determining whether to store them in the staging layer, in accordance with example embodiments described herein. As such, the operations described in connection with FIG. 6 illustrate example refinements of operations 504 and 510 of FIG. 5. In this regard, the operations described in connection with FIG. 6 may follow from operations 502 or 508, described above, and may in turn be followed by operations 506 or 512. In this regard, FIG. 6 illustrates a scenario in which a set of records are received from a plurality of data sources. For each particular record received, the following procedure may be implemented in some embodiments.

In operation 602 the apparatus 400 includes means such as data ingestion circuitry 410 or the like, for determining whether the particular record corresponds to a preexisting record in one of the stage tables in the staging layer. In some embodiments, the apparatus 400 may perform this determination by hydrating one or more standardized plumbing fields for the particular record, and then comparing the hydrated standardized plumbing fields to standardized plumbing fields of the set of records stored in the stage table in the staging layer that corresponds to the data source from which the particular record is received. Specifically, this correspondence may be determined based on a comparison of a source primary key (e.g., the CDC_KEY) or its hash of the particular record with source primary keys or their hashes for the set of records in the stage table. When the source primary key of the particular record is identical to the source primary key of a preexisting record in the stage table, then the apparatus 400 may determine that the particular record corresponds to a preexisting record in the stage table. That is, if a record existing in the stage table shares the same unique source primary key for that source as the inbound record, the inbound record already exists in the stage table.

Additionally or alternatively, the fields that are compared may comprise the data source name (e.g., REC_SRC) field and the data source data set name (REC_SRC_TBL) fields, which in conjunction can uniquely identify the originating system of the particular record and any preexisting record in the stage table. Origination comparison can provide a useful clue regarding whether two records may correspond to each other. In an instance in which the particular record does correspond to a preexisting record, then the procedure advances to operation 604. If the particular record does not correspond to a preexisting record, however, the particular record is new, and the procedure advances to operation 608 to store the record.

In operation 604 the apparatus 400 includes means such as processor 402, memory 404, data ingestion circuitry 410 or the like, for determining whether the record has a SRC_DEL_FLG field equal to 'N'. If so, then the record corresponds to an existing record and the source table has not deleted the record. In this circumstance, the procedure advances to operation 606. If, however, SRC_DEL_FLG is equal to 'Y', then that indicates that the record corresponds to an existing record, but the source table has deleted the record. In that case, the procedure advances to operation 610, as the record will not be stored.

In operation 606, the apparatus 400 includes means such as data ingestion circuitry 410, or the like, for determining whether the particular record is different than the preexisting record that matched it in operation 602. In some embodiments, this may include a character comparison or a hash comparison between the standardized plumbing fields contained in the particular record to the standardized plumbing fields contained in the preexisting record in the stage table. In some embodiments, this may include hydrating one or more additional standardized plumbing fields for the particular record (e.g., the stage table primary key field (e.g., PRIM_KEY), and/or the source attribute data field (e.g., CDC_ATTR) to facilitate the determination of whether the particular record is different than the preexisting record). The source attribute data field or its hash of the inbound record and the source attribute data field of the preexisting record may be compared to determine if the non-primary data fields of the inbound record has changed since the preexisting record was stored in the staging table. If it is determined that there is not a match, the record has been modified since the preexisting record was ingested, and the procedure advances to operation 608 so that the changed version can be stored in the stage table. If it is determined that there is a match of the source attribute data fields, the stage table primary key fields of the inbound and preexisting records may be compared. If it is determined that there is not a match of the stage table primary key fields, this is an indication that the record has been modified back to a previous version of the record. That is, the data in the record has been modified since the preexisting record was ingested, and then modified again to revert back to a version of the record that matches the data in the preexisting record.

For example, as discussed previously in connection with FIG. 3D, an example is shown in which a data source 304 provides a first record identifying of an individual John Q Public who has a weight of 180 pounds, a second record identifying the same individual having a weight of 175 pounds, and then identifies a third record 340 of the same individual again having a weight of 180 pounds. Without use of a stage table primary key field comparison, the apparatus 400 would determine that the third record 340 is the same record as the first record, when in fact the third record 340 illustrates a reversion to the same collection of data, but at a different point in time. Instead, performance of the stage table primary key comparison indicates a change in data even though the data matches an earlier version of the record, and the procedure would advance to operation 608 so that the changed version can be stored in the stage table. If it is determined that there is a match of the stage table primary key, then there is no need to store the record, and the procedure advances to operation 610.

In operation 608 the apparatus 400 includes means such as data ingestion circuitry 410 or the like, for storing the record in a stage table corresponding to the data source from which the particular record is received. Storage of records is described in greater detail below in connection with FIG. 7. Following storage of the record, the procedure returns to operation 506 or 512, described previously, in which the data ingestion layer can be updated to account for the new records in the staging layer.

Finally, in operation 610, it is determined that the record is either a duplicate (if the procedure advances to operation 610 from operation 606) or has been deleted from the source table (if the procedure advanced to operation 610 from operation 604). In either case, the particular record is not stored, and the procedure returns to operation 506 or 512, described previously.

Turning next to FIG. 7, example operations are disclosed for ingesting a target record that is received from a particular data source, in accordance with some example embodiments described herein.

In operation 702, the apparatus 400 includes means such as data ingestion circuitry 410 or the like, for storing a copy of the target record in a particular stage table in the staging layer that corresponds to the particular data source.

In operation 704, the apparatus 400 includes means such as data ingestion circuitry 410 or the like, for inserting the set of standardized plumbing fields into the copy of the target record in the stage table. These standardized plumbing fields comprise a set of descriptive fields that in some embodiments includes a stage table primary key field, a source primary key field, a source attribute field, a data source name field, a data source data set name field, and a source delete flag, as described previously in connection with FIGS. 3A-3C. The standardized plumbing fields further include a timestamp field. In some embodiments, the descriptive fields further include at least one of an expiry timestamp field and a natural key field. As discussed previously, the expiry timestamp field illustrates a date and time at which a record was overwritten (if it was). Through the use of these standardized plumbing fields, the descriptive fields, when populated, facilitate the determination, by the data modeling platform 200, of changes in the record over time, even without understanding the underlying meaning of many attributes represented by fields in the record.

In operation 706, the apparatus 400 includes means such as data ingestion circuitry 410 or the like, for populating the standardized plumbing fields. In some embodiments, the apparatus 400 may populate the descriptive fields of the set of standardized plumbing fields based on the content of the target record. Additionally, the apparatus 400 may populate the timestamp field with a current date and time representing the time of ingestion. Finally, the apparatus 400 may optionally update an expiry timestamp field (e.g., EXPR_DTS) for all records stored in a stage table. In this regard, as noted previously in conjunction with a description of FIG. 3B, use of an expiry timestamp field can reduce the processing time needed for certain queries significantly despite the ability to derive the value of the expiry timestamp field from other fields included in the standardized plumbing fields, thus rendering this optional field.

As described above, example embodiments described herein provide methods and apparatuses that can increase the efficiency of data ingestion into a database modeling platform. To do this, example embodiments enable the ingestion of data before, after, or in parallel with evaluating and identifying business requirements for the data model. Similarly, through the use of type-2 data warehousing, example embodiments provide complete traceability of data back to the data sources, thus ensuring that the data modeling platform can efficiently respond to audits. Similarly, by employing a persistent staging layer, example embodiment also prevent the occurrence of unrecoverable errors because no source data is ever removed from the data modeling platform. Finally, through the use of standardized plumbing fields, data ingestion can be simplified into a content-agnostic procedure while still effectively capture changes in data sources over time, even before the complete development of the data modeling platform that will utilize the ingested data.

FIGS. 5-7 illustrate flowcharts describing the operation of apparatuses, methods, and computer program products according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory of an apparatus 400 employing an embodiment of the present invention and executed by a processor of the apparatus 400. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware and computer instructions.

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for improved data ingestion in a relational database management system, the method comprising:
    ingesting, by data ingestion circuitry and using a set of standardized plumbing fields comprising descriptive fields including a stage table primary key field, a source primary key field, and a source attribute field, one or more records from a plurality of data sources into one or more stage tables in a persistent staging layer, wherein each of the one or more stage tables corresponds to one of the plurality of data sources,
    determining whether each particular record of the one or more records corresponds to any preexisting record of a plurality of preexisting records in the one or more stage tables based on:
        a hash of at least one descriptive field and a date/time associated with the particular record, wherein the hash of the at least one descriptive field and the date/time associated with the particular record uniquely identifies the particular record, and wherein the date/time associated with the particular record comprises at least one of a timestamp or a date that the particular record was ingested into the persistent staging layer, and
        a plurality of hashes of the at least one descriptive field and a date/time associated with each preexisting record of the plurality of preexisting records, wherein each hash of the plurality of hashes uniquely identifies one preexisting record of the plurality of preexisting records,
    and
    generating, by data modeling circuitry and using the one or more stage tables in the persistent staging layer, a data integration layer for modeling data represented by the data ingested into the one or more stage tables in the persistent staging layer.

2. The method of claim 1, further comprising:
    storing a copy of each particular record in a particular stage table in the persistent staging layer that corresponds to the particular data source; and
    inserting the set of standardized plumbing fields into the copy of each particular record, the set of standardized plumbing fields further comprising a timestamp field;

populating descriptive fields of the set of standardized plumbing fields based on content of the target each particular record; and populating the timestamp field of each particular record with a current date and time.

3. The method of claim 1, wherein the at least one descriptive field comprises the stage table primary key field, the source primary key field, or the source attribute field.

4. The method of claim 1, wherein the descriptive fields further comprise: a data source name field, a data source data set name field, and a source delete flag.

5. The method of claim 4, wherein the descriptive fields further comprise at least one of an expiry timestamp field or a natural key field.

6. The method of claim 1, further comprising: in an instance in which the particular record corresponds to a preexisting record:
  determining whether the particular record has not been deleted in its corresponding data source,
  in an instance in which the particular record has not been deleted:
  determining whether the particular record is different than the preexisting record,
  in an instance in which the particular record is different than the preexisting record:
  storing the particular record;
  and
  in an instance in which the particular record does not correspond to a preexisting record:
  storing the particular record.

7. The method of claim 6, further comprising: comparing a source attribute field of the particular record to a source attribute field of the preexisting record;
  in an instance in which the source attribute field of the particular record matches the source attribute field of the preexisting record:
    comparing a stage table primary key field of the particular record to a stage table primary key field of the preexisting record,
  in an instance in which the stage table primary key field of the particular record matches the stage table primary key field of the preexisting record:
    determining that the particular record is not different than the preexisting record,
  in an instance in which the stage table primary key field of the particular record does not match the stage table primary key field of the preexisting record:
    determining that the particular record is different than the preexisting record;
    and
  in an instance in which the source attribute field of the particular record does not match the source attribute field of the preexisting record:
    determining that the particular record is different than the preexisting record.

8. The method of claim 1, further comprising:
  ingesting, by the data ingestion circuitry and using the set of standardized plumbing fields, one or more additional records from the plurality of data sources into the one or more stage tables in the persistent staging layer; and
  updating, by the data modeling circuitry, the data integration layer based on the one or more additional records.

9. An apparatus for improved data ingestion in a relational database management system, the apparatus comprising at least one processor and at least one memory storing computer-executable instructions, that, when executed by the at least one processor, cause the apparatus to:
  ingest, using a set of standardized plumbing fields comprising descriptive fields including a stage table primary key field, a source primary key field, and a source attribute field, one or more records from a plurality of data sources into one or more stage tables in a persistent staging layer, wherein each of the one or more stage tables corresponds to one of the plurality of data sources,
  determine whether each particular record of the one or more records corresponds to any preexisting record of a plurality of preexisting records in the one or more stage tables based on:
    a hash of at least one descriptive field and a date/time associated with the particular record, wherein the hash of the at least one descriptive field and the date/time associated with the particular record uniquely identifies the particular record, and wherein the date/time associated with the particular record comprises at least one of a timestamp or a date that the particular record was ingested into the persistent staging layer, and
    a plurality of hashes of the at least one descriptive field and a date/time associated with each preexisting record of the plurality of preexisting records, wherein each hash of the plurality of hashes uniquely identifies one preexisting record of the plurality of preexisting records,
    and
  generate, using the one or more stage tables in the persistent staging layer, a data integration layer for modeling data represented by the data ingested into the one or more stage tables in the persistent staging layer.

10. The apparatus of claim 9, wherein the computer-executable instructions, when executed by the apparatus, further cause the apparatus to:
  process a query requesting information for retrieval;
  identify, using the data integration layer and a subset of the one or more stage tables, data corresponding to the information for retrieval; and
  output the identified data.

11. The apparatus of claim 9, wherein the at least one descriptive field comprises the stage table primary key field, the source primary key field, or the source attribute field.

12. The apparatus of claim 9, wherein the descriptive fields further comprise: a data source name field, a data source data set name field, and a source delete flag.

13. The apparatus of claim 12, wherein the descriptive fields further comprise at least one of an expiry timestamp field or a natural key field.

14. The apparatus of claim 9, wherein the computer-executable instructions, when executed by the apparatus, further cause the apparatus to: in an instance in which the particular record corresponds to a preexisting record:
  determine whether the particular record has not been deleted in its corresponding data source,
  in an instance in which the particular record has not been deleted:
  determine whether the particular record is different than the preexisting record,
  in an instance in which the particular record is different than the preexisting record:
  store the particular record; and
  in an instance in which the particular record does not correspond to a preexisting record:
  store the particular record.

15. The apparatus of claim 14, wherein the computer-executable instructions, when executed by the apparatus, further cause the apparatus to: compare a source attribute field of the particular record to a source attribute field of the preexisting record;
- in an instance in which the source attribute field of the particular record matches the source attribute field of the preexisting record:
  - compare a stage table primary key field of the particular record to a stage table primary key field of the preexisting record,
- in an instance in which the stage table primary key field of the particular record matches the stage table primary key field of the preexisting record:
  - determine that the particular record is not different than the preexisting record,
- in an instance in which the stage table primary key field of the particular record does not match the stage table primary key field of the preexisting record:
  - determine that the particular record is different than the preexisting record; and
- in an instance in which the source attribute field of the particular record does not match the source attribute field of the preexisting record:
  - determine that the particular record is different than the preexisting record.

16. The apparatus of claim 9, wherein the computer-executable instructions, when executed by the apparatus, further cause the apparatus to:
- ingest, using the set of standardized plumbing fields, one or more additional records from the plurality of data sources into the one or more stage tables in the persistent staging layer; and
- update the data integration layer based on the one or more additional records.

17. A computer program product comprising at least one non-transitory computer-readable storage medium for improved data ingestion in a relational database management system, the at least one non-transitory computer-readable storage medium storing computer-executable instructions that, when executed, cause an apparatus to:
- ingest, using a set of standardized plumbing fields comprising descriptive fields including a stage table primary key field, a source primary key field, and a source attribute field, one or more records from a plurality of data sources into one or more stage tables in a persistent staging layer, wherein each of the one or more stage tables corresponds to one of the plurality of data sources,
- determine whether each particular record of the one or more records corresponds to any preexisting record of a plurality of preexisting records in the one or more stage tables based on:
  - a hash of at least one descriptive field and a date/time associated with the particular record, wherein the hash of the at least one descriptive field and the date/time associated with the particular record uniquely identifies the particular record, and wherein the date/time associated with the particular record comprises at least one of a timestamp or a date that the particular record was ingested into the persistent staging layer, and
  - a plurality of hashes of the at least one descriptive field and a date/time associated with each preexisting record of the plurality of preexisting records, wherein each hash of the plurality of hashes uniquely identifies one preexisting record of the plurality of preexisting records, and
  - generate, using the one or more stage tables in the persistent staging layer, a data integration layer for modeling data represented by the data ingested into the one or more stage tables in the persistent staging layer.

18. The computer program product of claim 17, wherein the computer-executable instructions, when executed, further cause the apparatus to:
- process a query requesting information for retrieval;
- identify, using the data integration layer and a subset of the one or more stage tables, data corresponding to the information for retrieval; and
- output the identified data.

19. The computer program product of claim 17, wherein the at least one descriptive field comprises the stage table primary key field, the source primary key field, or the source attribute field.

20. The computer program product of claim 17, wherein the computer-executable instructions, when executed, further cause the apparatus to: in an instance in which the particular record corresponds to a preexisting record:
- determine whether the particular record has not been deleted in its corresponding data source,
- in an instance in which the particular record has not been deleted:
- determine whether the particular record is different than the preexisting record,
- in an instance in which the particular record is different than the preexisting record:
- store the particular record; and
- in an instance in which the particular record does not correspond to a preexisting record:
- store the particular record.

* * * * *